(12) United States Patent
Upmanyu et al.

(10) Patent No.: US 12,296,948 B2
(45) Date of Patent: May 13, 2025

(54) VARIABLE MORPHING WING USING SURFACE ACTUATED ORIGAMI FOLDS

(71) Applicant: Northeastern University, Boston, MA (US)

(72) Inventors: Moneesh Upmanyu, Boston, MA (US); Raman Vaidya, Boston, MA (US)

(73) Assignee: Northeastern University, Boston, MA (US)

( * ) Notice: Subject to any disclaimer, the term of this patent is extended or adjusted under 35 U.S.C. 154(b) by 0 days.

(21) Appl. No.: 17/721,962

(22) Filed: Apr. 15, 2022

(65) Prior Publication Data

US 2022/0332406 A1 Oct. 20, 2022

Related U.S. Application Data

(60) Provisional application No. 63/175,075, filed on Apr. 15, 2021.

(51) Int. Cl.
*B64C 3/48* (2006.01)
*B64C 3/14* (2006.01)
(Continued)

(52) U.S. Cl.
CPC .................. *B64C 3/48* (2013.01); *B64C 3/14* (2013.01); *B64C 3/26* (2013.01); *B64C 23/069* (2017.05); *B64C 2003/142* (2013.01)

(58) Field of Classification Search
CPC ........... B64C 3/182; B64C 13/24; B64C 3/10; B64C 3/38; B64C 3/48; B64C 3/14;
(Continued)

(56) References Cited

U.S. PATENT DOCUMENTS 7,550,189 B1 * 6/2009 McKnight ................ B64C 3/26
148/563
11,519,275 B1 * 12/2022 Neely ..................... F01D 5/147
(Continued)

FOREIGN PATENT DOCUMENTS

EP         2965985 A1 *  1/2016  ............... B64C 3/38
WO  WO-2021109312 A1 *  6/2021  ............... B64C 3/38

OTHER PUBLICATIONS

Woods, B.K.S. et al., "Preliminary Investigation of a Fishbone Active Camber Concept", Proceedings of the ASME 2012 Conference on Smart Materials, Adaptive Structures and Intelligent Systems SMASIS2012, Sep. 19-21, 2012, Stone Mountain, Georgia, USA, 9 pgs.

(Continued)

*Primary Examiner* — Richard Green
*Assistant Examiner* — Nevena Aleksic
(74) *Attorney, Agent, or Firm* — Verrill Dana, LLP

(57) ABSTRACT

Morphable active corrugate structure and aeronautical wings are provided herein including one or more skins or envelopes, and a sheet having independently actuable hinge domains attached to the one or more skins or envelopes and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet, wherein the sheet is attached to the upper and lower skins at respective upper and lower of the hinge domains.

21 Claims, 19 Drawing Sheets

(51) Int. Cl.
*B64C 3/26* (2006.01)
*B64C 23/06* (2006.01)

(58) Field of Classification Search
CPC .................. B64C 3/26; B64C 23/069; B64C 2003/142; B64C 3/385; B64C 3/52; B62D 37/02
See application file for complete search history.

(56) References Cited

U.S. PATENT DOCUMENTS

2006/0157623 A1* 7/2006 Voglsinger ................ B64C 3/48
244/219
2019/0256189 A1* 8/2019 Fenske ...................... B64C 3/44

OTHER PUBLICATIONS

Magar, K.T. et al., "Active Control of Origami Inspired Camber Morphing Airfoil for Gust Load Alleviation", Proceedings of the ASME 2018 Conference on Smart Materials, Adaptive Structures and Intelligent Systems SMASIS2018, Sep. 10-12, 2018, San Antonio, Texas, USA, 8 pgs.

* cited by examiner

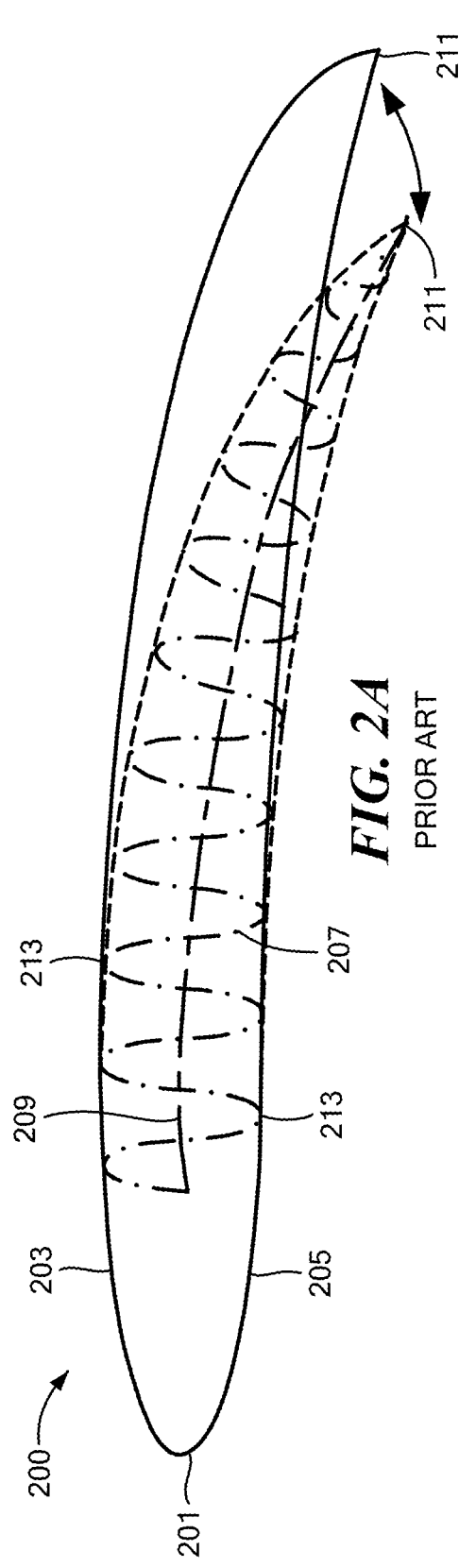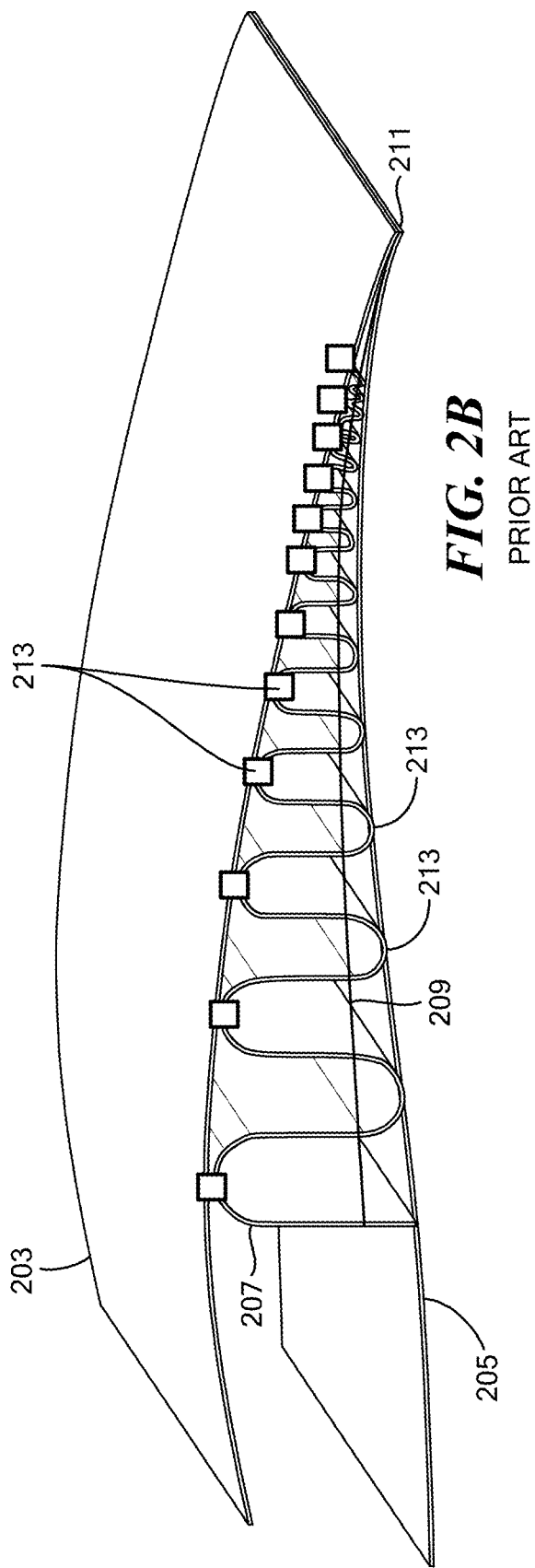
FIG. 2A PRIOR ART
FIG. 2B PRIOR ART

VARIABLE MORPHING WING USING SURFACE ACTUATED ORIGAMI FOLDS

CROSS REFERENCE TO RELATED APPLICATIONS

This application claims benefit under 35 U.S.C. § 119(e) of U.S. Provisional Application No. 63/175,075, filed on 15 Apr. 2021, entitled "Variable Camber Morphing Wing Using Surface Actuated Origami Folds," the disclosure of which is incorporated by reference herein.

BACKGROUND

Conventional wing designs generally include an airfoil having one or more conventional control surfaces such as hinged flaps and ailerons. As shown in FIG. 1, the airfoil 100 typically includes a leading edge 101, a convex upper camber 103 surface, a concave lower camber 105, and a trailing edge 111. At portions of the wing where the control surfaces are provided, the control surface 107 generally forms a portion of the airfoil 100 and is hingedly 109 attached to the airfoil 100 to provide movement with one degree of freedom. These designs are cumbersome and heavy with several moving parts, the control surfaces are generally slow to actuate, and the wing is fuel inefficient due to limited control over the lift-to-drag ratio.

Referring now to FIGS. 2A-2B, a current approach to replacing conventional control surfaces involves the use of a shape-changing airfoil 200 having a passive corrugated sheet 207 bonded to top 203 and bottom 205 skins (the upper and lower camber) at attachment points 213 in order to form the airfoil 200 that makes up the wing.

In such approaches, the shape of the passive corrugate 207 can be altered by compressing or stretching the corrugate 207 to create a flex in the leading 201 and trailing 211 edges of the airfoil 200. For general understanding, as shown in FIG. 3, corrugates generally have a stiff direction (dimension) extending parallel to the channels formed in the corrugate and a flexible direction (dimension) extending perpendicular to the channels formed in the corrugate. The compressing or stretching in such systems occurs only in the flexible direction. To achieve stretching and compressing of the passive corrugate 207, a wire 209 extends through channels of the passive corrugate 207 and can be tensioned or de-tensioned. However, such tensioning or other systems using an externally applied force severely limit the form and extent of the shape change and the flex that is achievable. In addition, large cyclical stresses within the corrugate 207 during tensioning render these structures vulnerable to mechanical fatigue, reducing the lifetime of the airfoil.

SUMMARY

Embodiments of a variable camber morphing wing using surface actuated origami folds are provided.

In one aspect a morphable active corrugate structure is provided. The morphable active corrugate structure includes upper and lower skins. The morphable active corrugate structure also includes a sheet having independently actuable hinge domains and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet, wherein the sheet is attached to the upper and lower skins at respective upper and lower of the hinge domains.

In some embodiments, the differential strains cause the sheet to at least one of deform or bend along an axis of the sheet perpendicular to the flexible axis. In some embodiments, the skin is elastic. In some embodiments, in a fully expanded state of the hinge domains and the facet domains, the sheet is flat and extends in parallel contact with the upper and lower skins. In some embodiments, in a contracted state of at least one of the hinge domains and the facet domains, the sheet is at least one of folded or corrugated and the facet domains are at least partially separated from the upper and lower skins. In some embodiments, in a fully expanded state of the hinge domains and the facet domains, the sheet is at least one of folded or corrugated and the facet domains are at least partially separated from the upper and lower skins. In some embodiments, at least one of expansion or contraction of the sheet causes flexure of the upper and lower skins. In some embodiments, at least one of expansion or contraction of the sheet causes flexure of at least one of the upper skin or the lower skin along a stiff axis of the sheet, perpendicular to the flexible axis of the sheet. In some embodiments, the morphable active corrugate structure also includes an actuation mechanism, the actuation mechanism including at least one of thermal actuation, electrical actuation, magnetic actuation, pneumatic actuation, phase actuation, or combinations thereof.

In another aspect a morphable enveloped corrugate structure is provided. The morphable enveloped corrugate structure includes an envelope skin. The morphable enveloped corrugate structure also includes a sheet within the envelope skin having independently actuable hinge domains attached to the envelope skin and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet.

In some embodiments, at least one of expansion or contraction of the sheet causes flexure of the envelope skin along the flexible axis of the sheet. In some embodiments, at least one of expansion or contraction of the sheet causes flexure of the envelope skin along a stiff axis of the sheet, perpendicular to the flexible axis of the sheet. In some embodiments, the envelope skin is an airfoil shaped wing envelope. In some embodiments, the morphable enveloped corrugate structure also includes an actuation mechanism, the actuation mechanism including at least one of thermal actuation, electrical actuation, magnetic actuation, pneumatic actuation, phase actuation, or combinations thereof.

In another aspect an aeronautical wing is provided. The aeronautical wing includes a wing envelope. The aeronautical wing also includes a sheet within the wing envelope having independently actuable hinge domains attached to the wing envelope and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet.

In some embodiments, the aeronautical wing also includes an actuation mechanism, the actuation mechanism including at least one of thermal actuation, electrical actuation, magnetic actuation, pneumatic actuation, phase actuation, or combinations thereof. In some embodiments, the flexible axis of the sheet is oriented parallel to a chordwise axis of the wing envelope. In some embodiments, the aeronautical wing also includes at least one additional sheet within the wing envelope, the at least one additional sheet positioned adjacent to or spaced apart from the sheet along a spanwise axis of the wing envelope. In some embodiments, at least one of expansion or contraction of the sheet causes flexure of the wing envelope along the flexible axis of the sheet. In some embodiments, the flexure of the wing envelope along the flexible axis of the sheet alters at least one of a lift produced by the aeronautical wing or a coefficient of drag of the aeronautical wing. In some embodiments, at least one of expansion or contraction of the sheet causes flexure of the wing envelope along a stiff axis of the sheet, perpendicular to the flexible axis of the sheet. In some embodiments, the flexure of the wing envelope along the stiff axis of the sheet forms a winglet of the aeronautical wing.

Additional features and aspects of the technology include the following:

1. A morphable active corrugate structure comprising:
   upper and lower skins; and
   a sheet having independently actuable hinge domains and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet, wherein the sheet is attached to the upper and lower skins at respective upper and lower of the hinge domains.
2. The morphable active corrugate structure of feature 1, wherein the differential strains cause the sheet to at least one of deform or bend along an axis of the sheet perpendicular to the flexible axis.
3. The morphable active corrugate structure of any of features 1-2, wherein the skin is elastic.
4. The morphable active corrugate structure of feature 3, wherein:
   in a fully expanded state of the hinge domains and the facet domains, the sheet is flat and extends in parallel contact with the upper and lower skins; and
   in a contracted state of at least one of the hinge domains and the facet domains, the sheet is at least one of folded or corrugated and the facet domains are at least partially separated from the upper and lower skins.
5. The morphable active corrugate structure of any of features 1-4, wherein in a fully expanded state of the hinge domains and the facet domains, the sheet is at least one of folded or corrugated and the facet domains are at least partially separated from the upper and lower skins.
6. The morphable active corrugate structure of feature 5, wherein at least one of expansion or contraction of the sheet causes flexure of the upper and lower skins.
7. The morphable enveloped corrugate structure of any of features 1-6, wherein at least one of expansion or contraction of the sheet causes flexure of at least one of the upper skin or the lower skin along a stiff axis of the sheet, perpendicular to the flexible axis of the sheet.
8. The morphable active corrugate structure of any of features 1-7, further comprising an actuation mechanism, the actuation mechanism including at least one of thermal actuation, electrical actuation, magnetic actuation, pneumatic actuation, phase actuation, or combinations thereof.
9. A morphable enveloped corrugate structure comprising:
   an envelope skin;
   a sheet within the envelope skin having independently actuable hinge domains attached to the envelope skin and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet.
10. The morphable enveloped corrugate structure of feature 9, wherein at least one of expansion or contraction of the sheet causes flexure of the envelope skin along the flexible axis of the sheet.
11. The morphable enveloped corrugate structure of any of features 9-10, wherein at least one of expansion or contraction of the sheet causes flexure of the envelope skin along a stiff axis of the sheet, perpendicular to the flexible axis of the sheet.
12. The morphable enveloped corrugate structure of any of features 9-11, wherein the envelope skin is an airfoil shaped wing envelope.
13. The morphable enveloped corrugate structure of any of features 9-12, further comprising an actuation mechanism, the actuation mechanism including at least one of thermal actuation, electrical actuation, magnetic actuation, pneumatic actuation, phase actuation, or combinations thereof.
14. An aeronautical wing comprising:
   a wing envelope;
   a sheet within the wing envelope having independently actuable hinge domains attached to the wing envelope and independently actuable facet domains, each of the hinge domains and facet domains configured with through-thickness differential expansion coefficients, wherein differential strains in at least one of the hinge domains or the facet domains cause the sheet to expand or contract along a flexible axis of the sheet.
15. The aeronautical wing of feature 14, further comprising an actuation mechanism, the actuation mechanism including at least one of thermal actuation, electrical actuation, magnetic actuation, pneumatic actuation, phase actuation, or combinations thereof.
16. The aeronautical wing of any of features 14-15, wherein the flexible axis of the sheet is oriented parallel to a chordwise axis of the wing envelope.
17. The aeronautical wing of any of features 14-16, further comprising at least one additional sheet within the wing envelope, the at least one additional sheet positioned adjacent to or spaced apart from the sheet along a spanwise axis of the wing envelope.
18. The aeronautical wing of any of features 14-17, wherein at least one of expansion or contraction of the sheet causes flexure of the wing envelope along the flexible axis of the sheet.
19. The aeronautical wing of feature 18, wherein the flexure of the wing envelope along the flexible axis of the sheet alters at least one of a lift produced by the aeronautical wing or a coefficient of drag of the aeronautical wing.
20. The aeronautical wing of any of features 14-19, wherein at least one of expansion or contraction of the sheet causes flexure of the wing envelope along a stiff axis of the sheet, perpendicular to the flexible axis of the sheet.
21. The aeronautical wing of feature 20, wherein the flexure of the wing envelope along the stiff axis of the sheet forms a winglet of the aeronautical wing.

DESCRIPTION OF THE DRAWINGS

FIGS. 2A-2B are cross-sectional views of a wire-tensioned corrugate in accordance with the prior art.

DETAILED DESCRIPTION

Efficient design of aeronautical wings is advantageous for reducing their energy consumption. The ability to change the shape of ("morph") the wing is an attractive solution wherein the wing is able to adapt to flight conditions and low noise requirements, eliminating the need for cumbersome and inefficient mechanisms based on flaps and ailerons.

Figure 1:
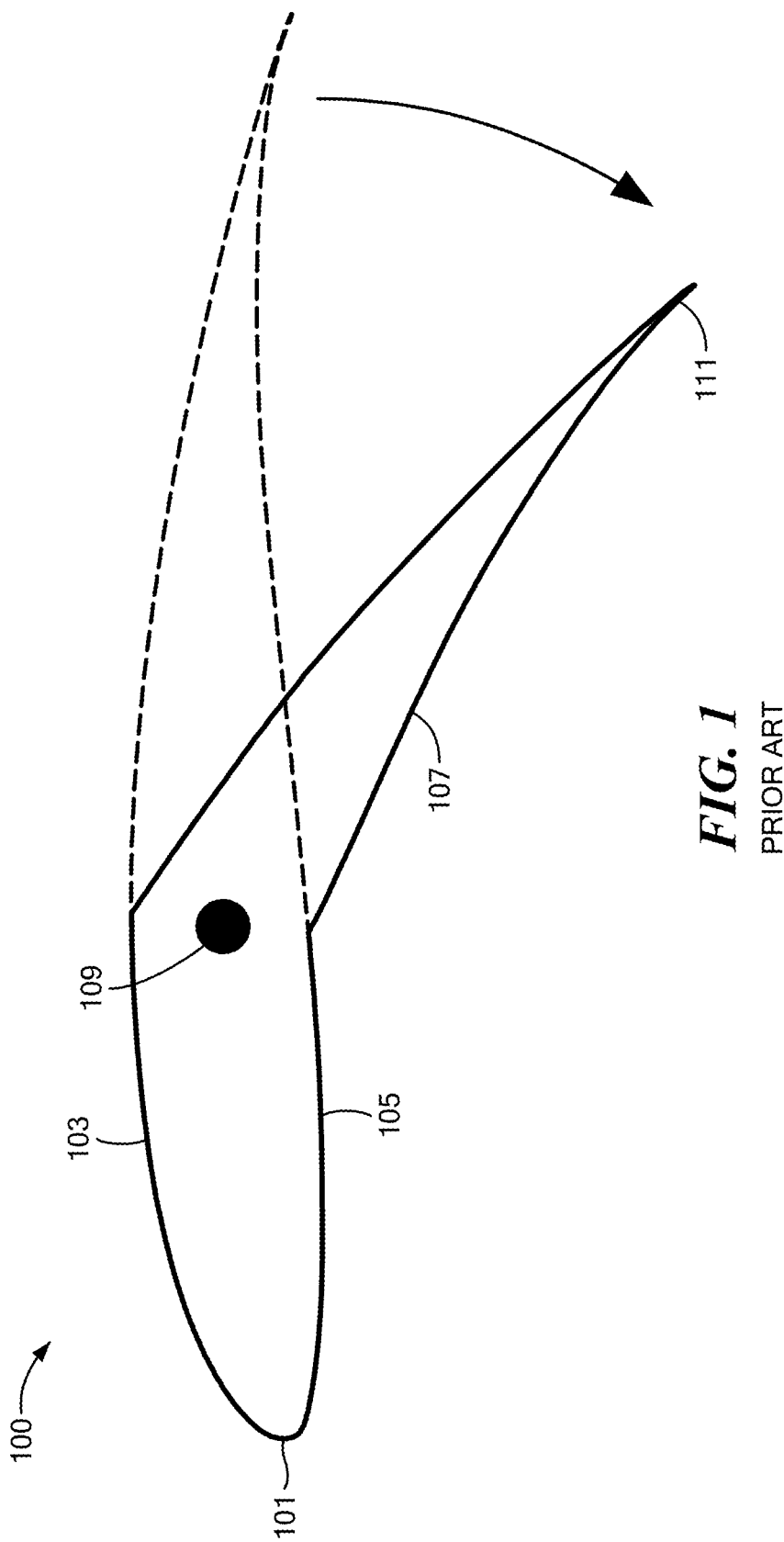
FIG. 1 is a cross-sectional view of an airfoil having a conventional control surface in accordance with the prior art.
Figure 3:
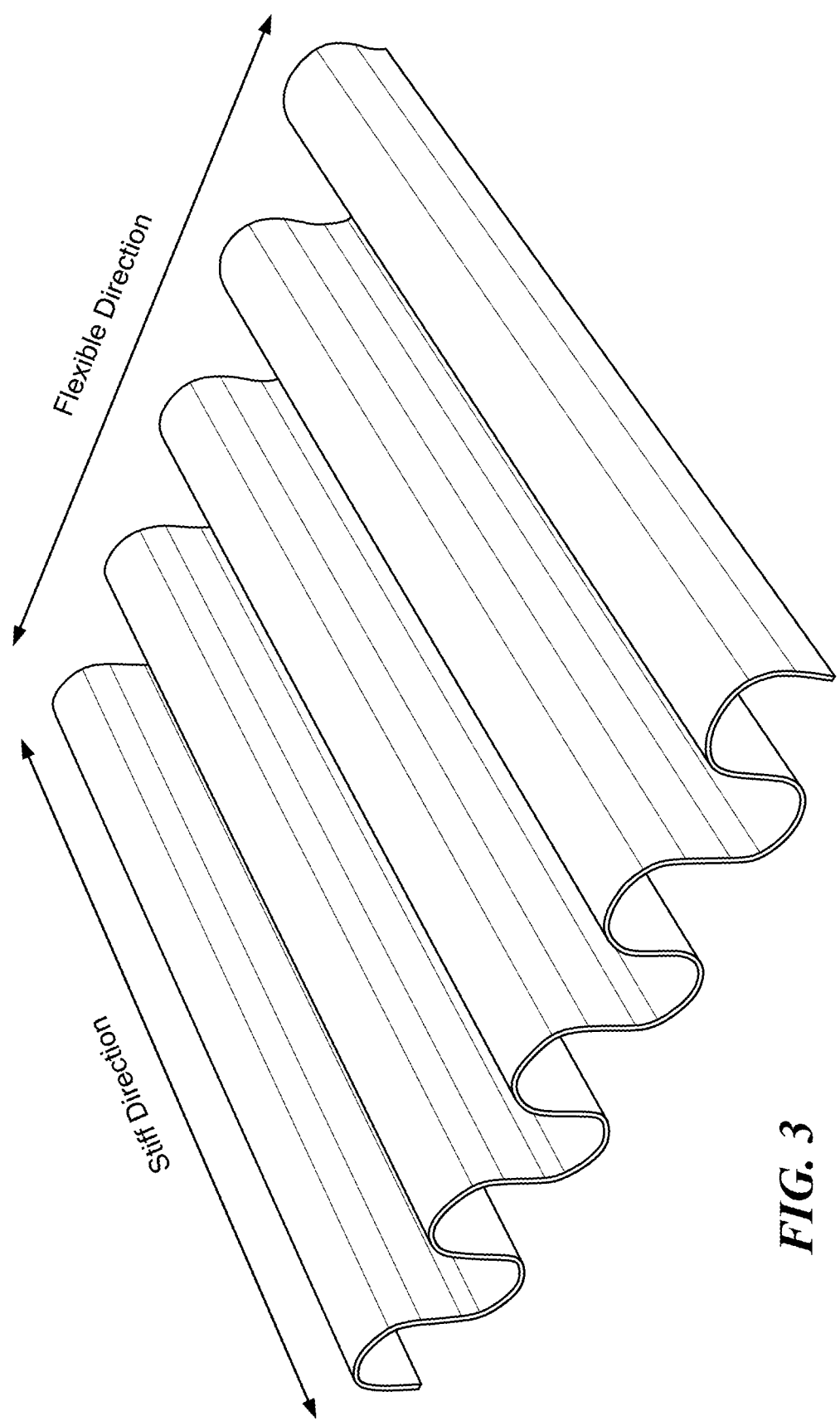
FIG. 3 is an isometric elevation illustrating stiff and flexible axes of a corrugate.
Figure 4A:
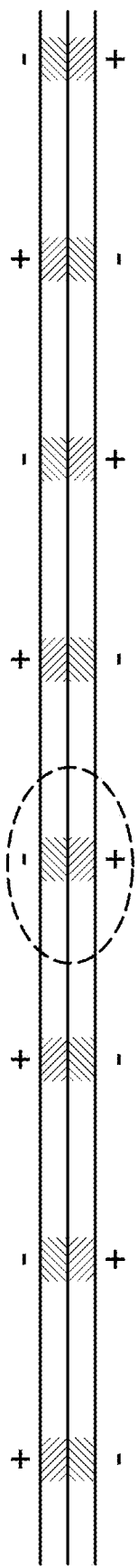
FIGS. 4A-4C illustrate hinge-only expansion and contraction for shape control of a corrugate having actuable hinges and rigid facets.
Figure 4B:
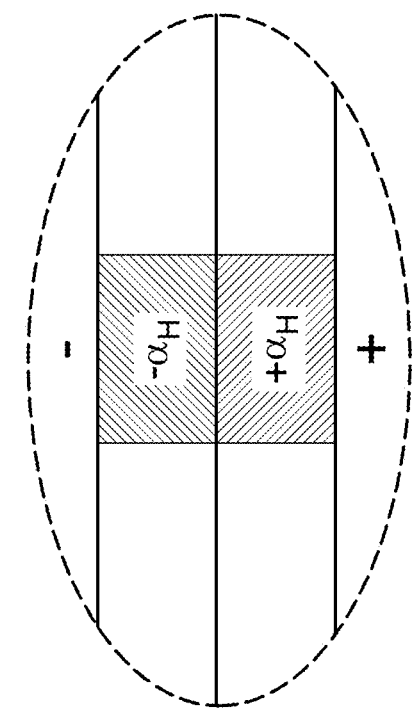
Figure 4C:
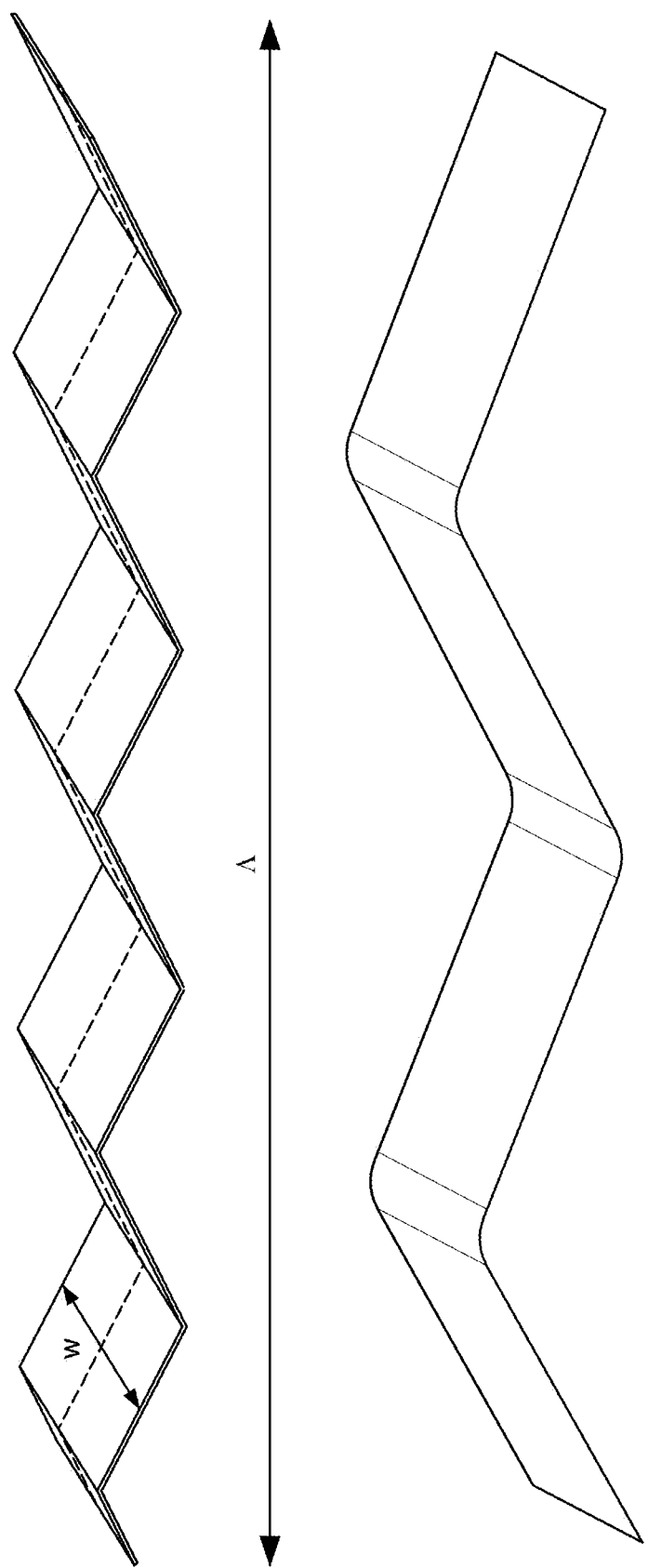

A first embodiment provides relatively low-control surface actuated corrugates as can be seen in FIGS. 4A-4C, which illustrate folds in a bilayer thin sheet having substantially rigid, non-actuable facets and actuable hinge domains with through-thickness differential strains that scale with the gradient in the local material (linear) expansion coefficient, $\alpha_H$. That is, the differential strains cause the corrugate sheet to fold around hinges. In that regard, the corrugated structure is a self-folding sheet that folds into an accordion-like fold of hinges connected by the facets as shown in FIG. 4C. In particular, the thickness gradients include positive expansion ($+\alpha_H$) in one layer and negative expansion ($-\alpha_H$) in a second layer as shown in FIG. 4B. By alternating orientations of the thickness gradients, a series of peak and valley folds is produced. In particular, where an upper layer is oriented for positive expansion and a lower layer is oriented for negative expansion, the sheet will form a peak and, where a lower layer is oriented for positive expansion and an upper layer is oriented for negative expansion, the sheet will form a valley. For clarity, in both FIGS. 4A and 4B, positive expansion hinge elements are indicated by a "+" and negative expansion hinge elements are indicated by a "−".

Such a configuration can advantageously provide similar morphability to the wire-tensioned designs described above and without the need for complex tensioning systems, thereby saving weight. However, challenges such as limited degrees of shape change freedom and elevated stresses associated with point-source actuation remain.

Provided herein are airfoils having sandwiched active corrugates using origami folding techniques which provide rapid, fully controlled, multiple degree-of-freedom morphing airfoil and wing structures.

Figure 5A:
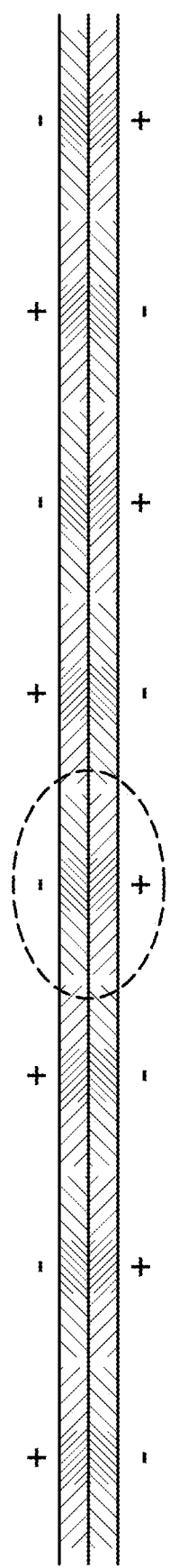
FIGS. 5A-5C illustrate gradient through-thickness expansion and contraction for shape control of a corrugate having actuable hinges and actuable facets ("active corrugate") in accordance with various embodiments.
Figure 5B:
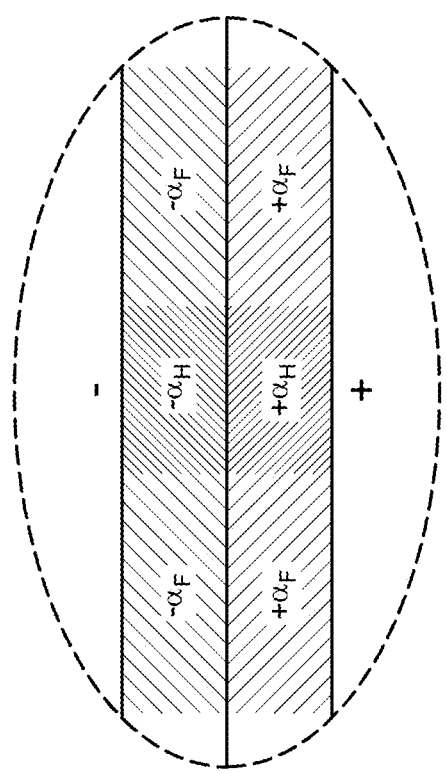
Figure 5C:
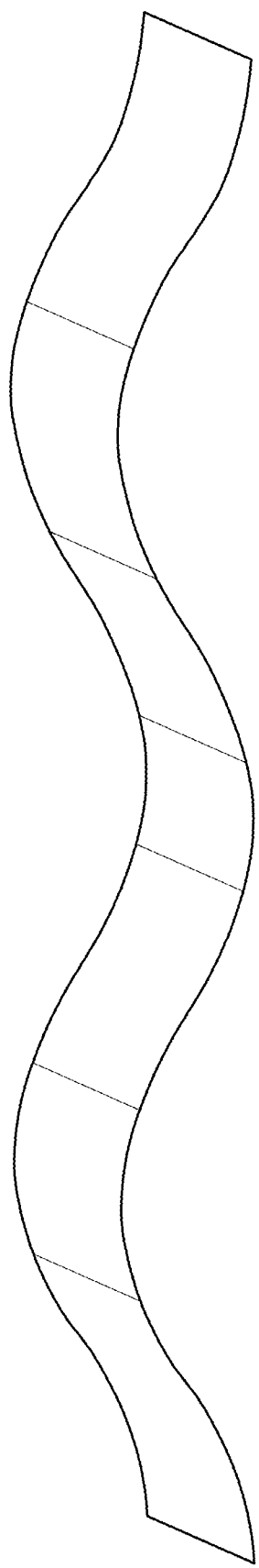

Referring now to FIGS. 5A-5C, a fully shape-controlled active corrugate is shown having corrugations in a bilayer thin sheet having both actuable facets and actuable hinge domains with through-thickness differential strains that scale with the gradient in the local material (linear) expansion coefficient ($\alpha_H$ for the hinges, $\alpha_F$ for the facets). Similar to the embodiment discussed in FIGS. 4A-4C, the differential strains $\alpha_H$ of the hinges cause the corrugate sheet to fold around the hinges. In that regard, as discussed above with respect to FIGS. 4A-4C, the corrugated structure is a self-folding sheet that folds into an accordion-like fold of hinges connected by the facets. In particular, the thickness gradients include positive expansion ($+\alpha_H$) in one layer and negative expansion ($-\alpha_H$) in a second layer as shown in FIG. 4C. By alternating orientations of the thickness gradients, a series of peak and valley folds is produced. In particular, where an upper layer is oriented for positive expansion and a lower layer is oriented for negative expansion, the sheet will form a peak and, where a lower layer is oriented for positive expansion and an upper layer is oriented for negative expansion, the sheet will form a valley. As shown in FIGS. 5A-5C, the hinges in the active corrugate disclosed herein are also connected by surface actuated facets with differential strains set by the expansion coefficient $\alpha_F$. The thickness gradient orientation changes midfacet as shown in FIG. 5A. A detail view of one valley is shown in FIG. 5B, where it can be seen that the valley-configured hinge ($-\alpha_H$ over $+\alpha_H$) is flanked by similarly oriented portions of adjacent facets ($-\alpha_F$ over $+\alpha_F$). In this manner, control is provided over not just the hinged domains to provide peaks and valleys, but also over the facets themselves to completely prescribe the shape of the corrugate between each peak and valley. For clarity, in both FIGS. 5A and 5B, positive expansion hinge elements (and adjacent half-facet elements) are indicated by a "+" and negative expansion hinge elements (and adjacent half-facet elements) are indicated by a "−".

More generally, the bending of the bilayer is driven by gradients in expansion coefficient of the sheets a across the thickness in response to changes in an actuation force F. For a bilayer where one sheet expands ($+\alpha$) and the other sheet contracts ($-\alpha$), the bending strains result in local curvature $K=\alpha\Delta F/h$, where h is the thickness of each layer within the bilayer. Spatial modulation of the a across the bilayer allows control over the shape of the entire sheet, from bending at the hinges connected by flat facets as shown in FIG. 4 to bending of the hinges and the facets as shown in FIG. 5.

As illustrated and described herein, the expansion coefficient and differential strains are generally expected to be higher at the hinge than in the facets. In particular because the hinges are expected to generally be thicker than the facets in order to provide better support and durability at the attachment point with the skin/membrane/surface (hereinafter "skin"). Nevertheless, it will be apparent in view of this disclosure that, in some embodiments, one or more facets may be thicker than one or more hinges and/or have a greater expansion coefficient and differential strain than one or more hinges as may be appropriate. Furthermore, it will be apparent in view of this disclosure that some or all of the hinges may be constructed of a different material or materials than some or all of the facets and/or other hinges. Similarly, facets may be constructed of a different material or materials than some or all of the hinges and/or other facets. That is, it will be apparent in view of this disclosure that any individual facet or hinge may have a different thickness and/or material construction than any other individual facet or hinge in accordance with various embodiments.

Figure 6:
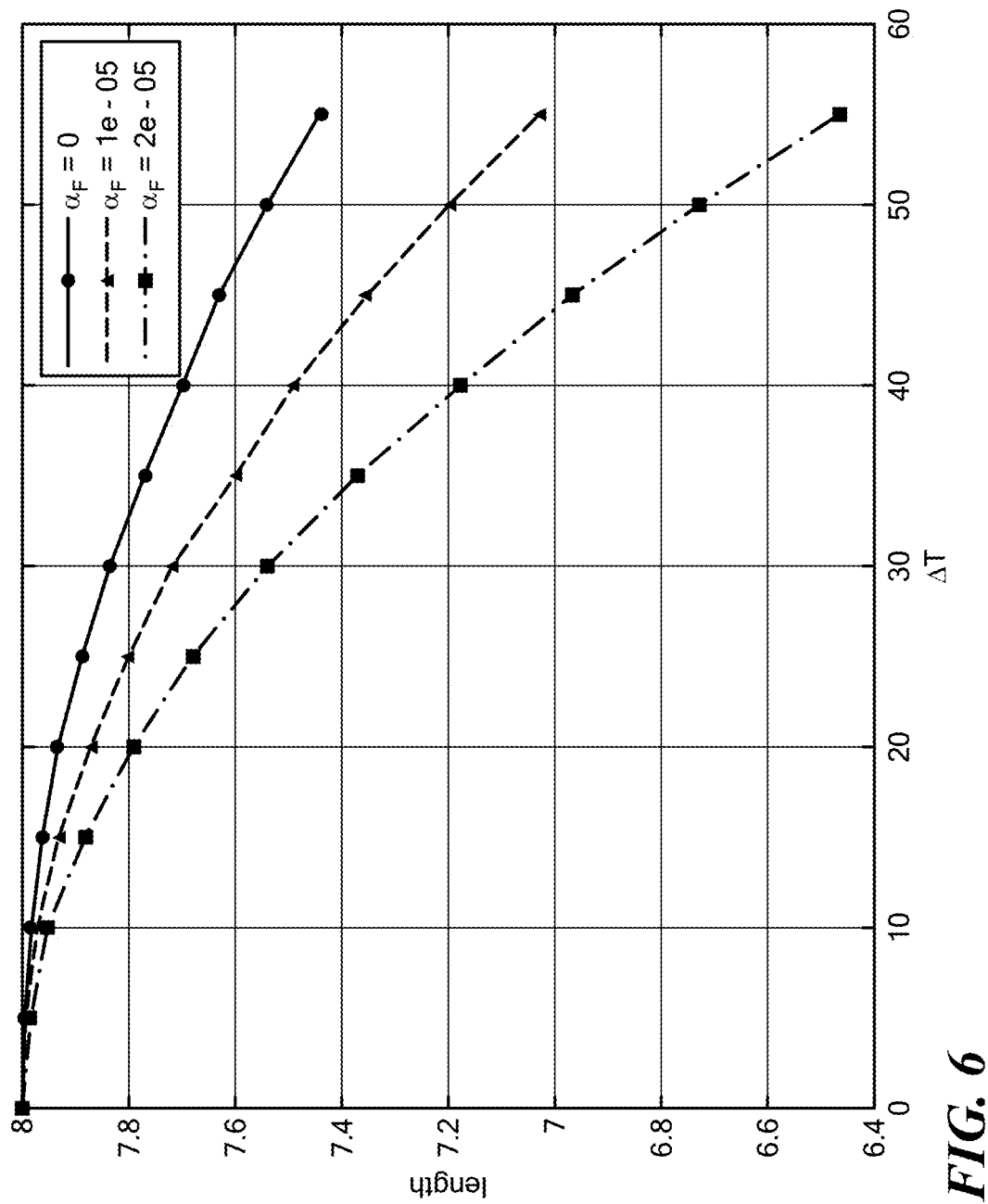
FIG. 6 illustrates dimensional change of thermally-actuated corrugates corresponding to different coefficients of thermal expansion in the facets in accordance with various embodiments.

Functionally, the active bending of facets amplifies the folding. Denoting $\alpha_H$ as the expansion of the two layers within the hinge region and $\alpha_F$ the expansion of the facets modulated in a manner indicated in FIGS. 5A-5C, the added effect of facets can be parametrized by the amplification ratio $\chi=\alpha_F/\alpha_H$. For baseline $\alpha_F=0$, as shown in FIG. 4, there is no amplification $\chi=0$. On actuation by a thermal expansion/contraction of the hinges and facets within the bilayer by change in temperature such that $\Delta F=\Delta T$, the development of the corrugations denoted by change in the end-to-end length of the sheet A is much more rapid as the expansion within the facets is increased as shown in FIG. 6. Here, the hinge region is prescribed an expansion of $\alpha_H=10^{-5}$ K$^{-1}$ and the thickness of sheet is fixed at 5 microns. Results show that for a $\Delta T=30$ K change in temperature, the corrugate contracts by an added 4.3% for surface facets with the same expansion coefficient as the hinges ($\chi=1$, $\alpha_F=1e^{-5}$). The contraction changes by 12% for surface facets with twice the expansion compared to that at the hinges $\chi=2$, $\alpha_F=2e^{-5}$).

The active corrugates can be actuated by a variety of driving forces graded through their thickness. Our results give a benchmark for the extent of actuation for a given driving force and differential expansion coefficients. Such actuation drivers broadly fall into at least one of the categories of thermal actuation, electrical actuation, magnetic actuation, pneumatic actuation, phase actuation, or combinations thereof. Such actuation drivers can include at least one of:

Pneumatic actuation driven by differences in pressure $\Delta F=\Delta p(z)$ such as, for example, gradients in pressure across the thickness of the corrugate by controlling the pressure on the two surfaces. This can be achieved using a network of pneumatic actuators and/or incorporating one independent pneumatic channel in each layer of the active corrugate.

Pneumatic actuation driven by differences in stiffnesses/thicknesses of the hinge and facets at constant pressure (e.g. $\Delta F=p/\Delta h$) where $\Delta h$ is the difference in thickness of the hinge and facet regions. For example, a stiff carbon fiber strip bonded on a highly deformable elastomer (e.g., butadiene) and exposing the spatially modulated composite to an interior/exterior pressure differential results in deformation.

Thermal actuation driven by driven by differences in temperature $\Delta F=\Delta T(z)$ such as, for example, spatially modulating the temperature difference across the thickness of the sheet using a thermally conducting layer bonded to a thermally insulating layer. In this example the difference in thermal expansion of the two sheets drives the shape change. Example constructions would include but not be limited to Al on glass.

Thermal actuation driven by differences in thermal expansion coefficient, as shown in FIG. 6. This could be achieved, for example, by spatially modulating the expansion coefficient difference across the thickness of the sheet. The difference in thermal expansion of the two sheets drives the shape change. Example constructions would include, but not be limited to, Al on AlN, Al on Ti.

Electrical actuation driven by differences in piezoelectric coefficient $d_{33}$ or electric field such as, for example but not limited to, in lead-based perovskites.

Magnetic actuation driven by differences in the magnetostrictive coefficient $\lambda$ or magnetic field such as, for example but not limited to, in Fe-based Metglas and Galfenol.

Phase actuation by reversible phase change within the bilayers, such as, for example but not limited to, differential freezing in porous materials, differential swelling of hydrogels driven by water content, and pH and/or UV curing of photo-active polymers (although this particular implementation would only be suitable in implementations where a single, irreversible morphology was desirable).

More generally, the bilayer material selection is dictated by the actuation strategy. For example and without limitation, for pneumatic actuation driven by gradients in stiffness, a stiff carbon fiber hinge region bonded to an elastomer (butadiene styrenes, e.g.) allows a large gradient in material stiffness. In several cases, multiple driving forces can be combined to further amplify the response. Examples include differential swelling of temperature sensitive hydrogels induced by changes in water content, pH and temperature, as well as pneumatic and electric actuation using dielectric elastomers.

In addition to increasing the expansion coefficients and the driving forces, the efficiency and rapidity of the corrugate development can also be manipulated by geometry. This includes changes in the relative areas of the hinge and facet domains, changes in the thickness of the sheet that affect both the bending stiffness and the thickness of the sheet that affects the gradient of the driving force and/or the expansion coefficient.

Sandwiched Corrugate Morphology

Figure 7:
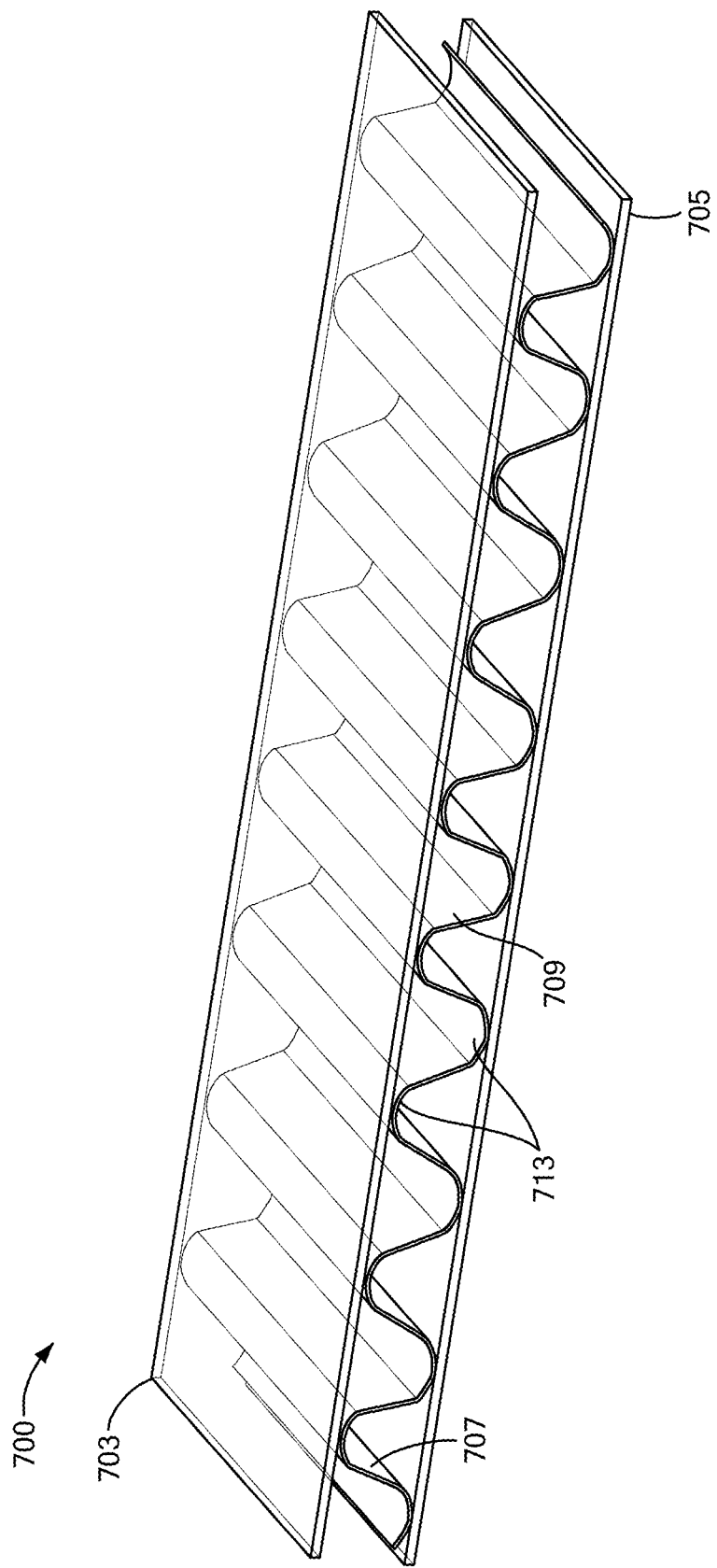
FIG. 7 illustrates an active corrugate bonded between upper and lower flexible skins in accordance with various embodiments.

Referring now to FIG. 7, in some embodiments, a sandwiched corrugate 700 can include the active corrugate 707, which can include actuable hinge domains 713 and actuable facets 709. The active corrugate 700 can generally be attached, at a plurality of hinge domain 713 sites, to each of an upper skin 703 and a lower skin 705. In some embodiments, the skin can be highly elastic and flexible, permitting significant variance in separation between the substantially unconstrained skins (i.e., thickness of the sandwiched corrugate 700) as is illustrated in FIGS. 8A-8D. In some embodiments, the skin can be less elastic, providing some resistance and constraint, thereby inducing more flex and less variation in separation thickness. Within a closed skin environment such as an airfoil or wing envelope, as shown in FIGS. 9A-9B, the constraint imposed by the bonding between the corrugate and the closed skin can lead to significant skin flexure to induce bending in the enveloped corrugate.

Figure 8A:
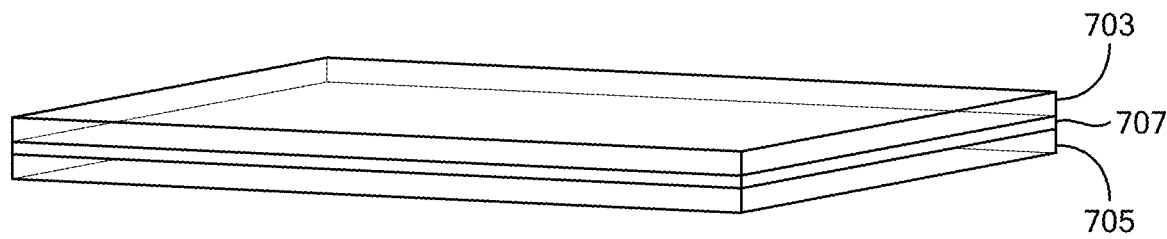
FIGS. 8A-8D illustrate various corrugate shape morphologies achievable by the active corrugate of FIG. 7 in accordance with various embodiments.
Figure 8B:
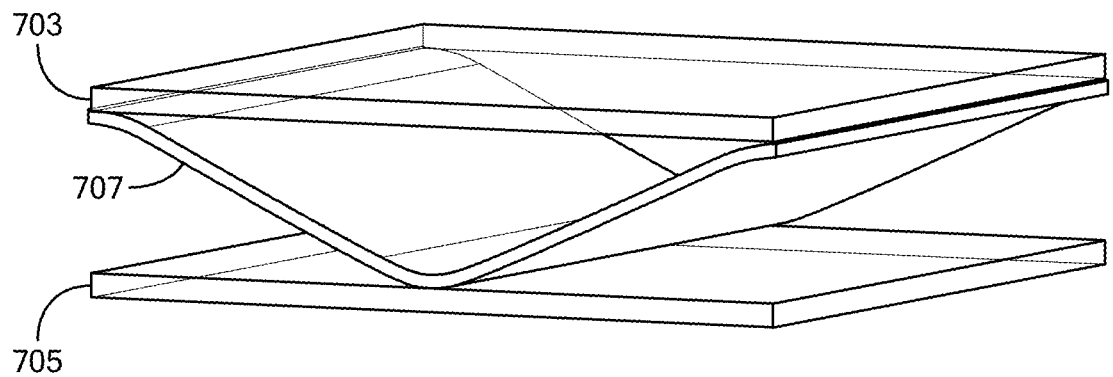
Figure 8C:
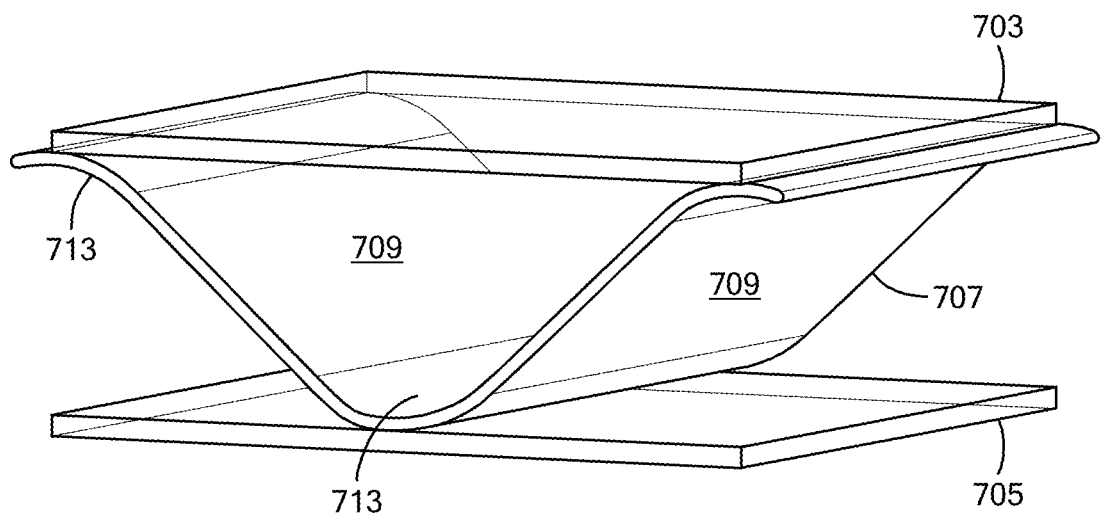
Figure 8D:
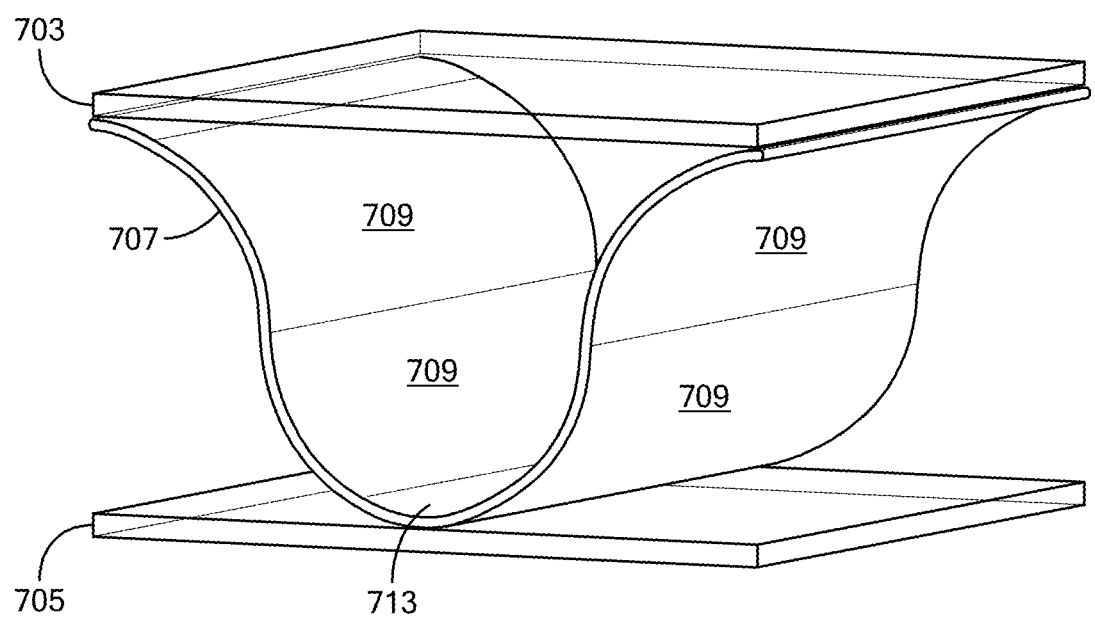
Figure 9A:
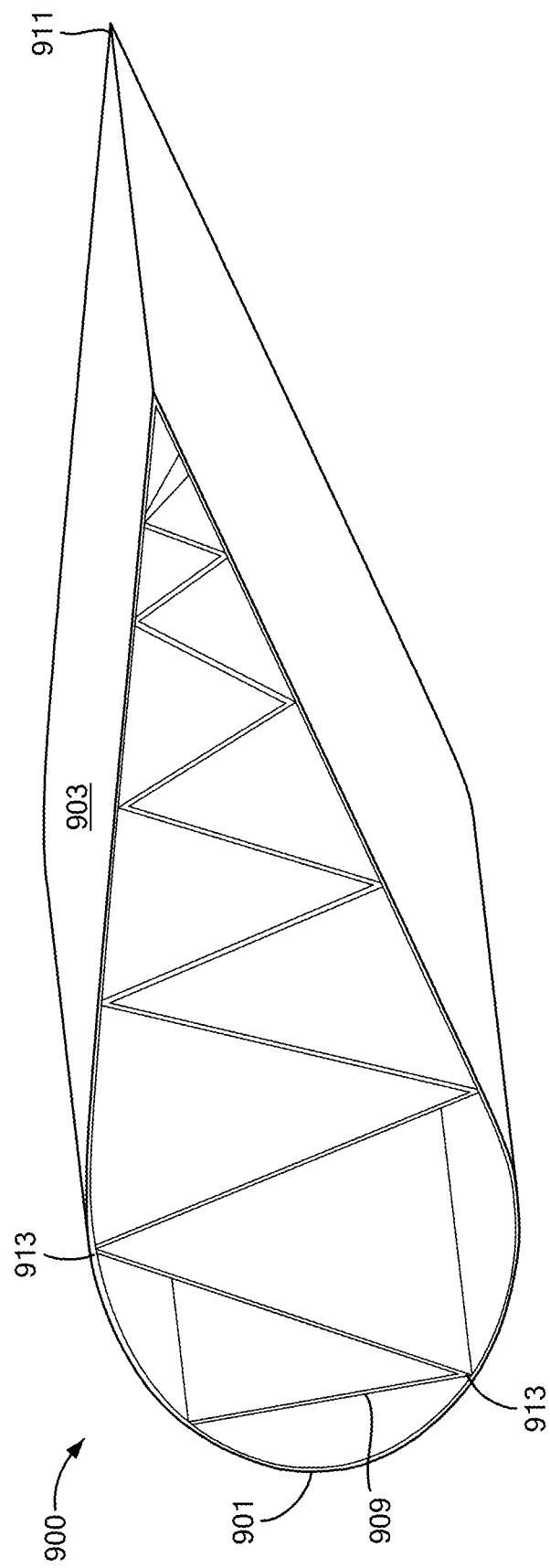
FIGS. 9A-9B illustrate two shape morphologies of an airfoil incorporating an active corrugate in accordance with various embodiments.
Figure 9B:
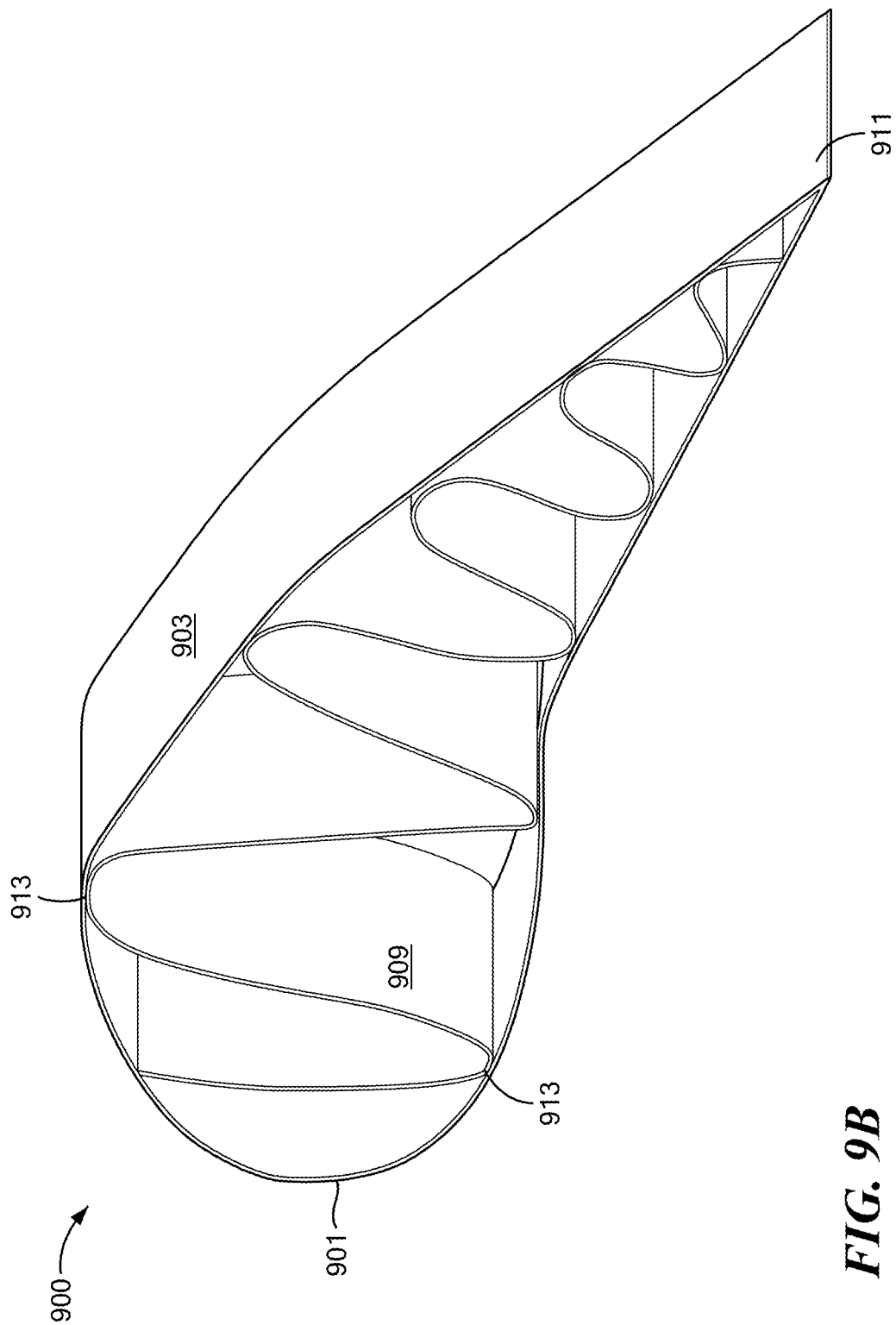

As shown in FIGS. 8A-8D, various morphologies of the active corrugate 707 within the sandwiched corrugate 700 can be achieved by use of the actuable hinges 713 in combination with the actuable facets 709. In particular, FIG. 8A illustrates a fully expanded state of the hinges 713 and facets 709, resulting in a flat active corrugate 707 and no separation (other than the thickness of the active corrugate 707 itself) between the upper skin 703 and lower skin 705. FIG. 8B illustrates a slightly contracted state of the hinges 713 and a fully expanded state of the facets 709, resulting in a substantially triangular shape of the active corrugate 707 and low separation between the upper skin 703 and lower skin 705. FIG. 8C illustrates a moderately contracted state of the hinges 713 and fully expanded state of the facets 709, resulting in a substantially triangular shape of the active corrugate 707 and moderate separation between the upper skin 703 and lower skin 705. FIG. 8D illustrates a fully contracted state of the hinges 713 and facets 709, resulting in a highly curved, folded corrugate 707, resulting in a high degree of separation between the upper skin 703 and lower skin 705.

Active Corrugates in Airfoils

As described herein, continuously morphable wings are provided by the use of active corrugates configured as surface actuated folding structures, where the shape change of the corrugations cascades to the shape change of the enveloping skin of the wing (see FIGS. 9A-9B and 10A-10B). Furthermore, it will be apparent in view of this disclosure that the active corrugate structures described and disclosed herein can be used in connection with any application where a morphable skin or overall geometry is desired. As discussed above, in some embodiments, both hinges and facets can flex and unbend allowing for both global and localized changes in shapes of the camber. The actuation is over the entire corrugated structure and can include implementations via at least one of pneumatic, magnetic, thermal, or electrical actuation, or combinations thereof. Hinge domains can generally allow control over their flex, resulting in larger deformations and energy absorption. In addition, the actuation of the corrugations is stimuli responsive through differential strains within the hinges as well as within the connecting facets. The complete shape of the corrugated structure can be controlled, including the fold angles, the shapes of the connecting facets. Appropriate designs of the hinges allow control over their flex, resulting in larger deformations and energy absorption.

In particular, the origami-based strategy with active facets described herein is essentially a hingeless design that can dramatically improve the robustness of the corrugate and any airfoils or other surfaces or geometries into which it is introduced. The hinge-facet actuation for corrugated camber design replaces legacy wire-compression strategy wherein the differential expansion is employed to fold the sheet around the hinges. The change in length of the active corrugate described herein leads to flexural deformations on the skins. The rapidity of the morphing is limited only by the differential expansion coefficient of the material systems used for the bilayer system. The differential expansion of the sheet as well as the hinges causes the sheet to flex, with complete prescription of the shape of the hinges as well as the sheets. The accordion-like folding consisting of hinges, connected by bending facets allow for both global and localized changes in shapes of the camber. Actuated changes in the waviness of the sandwiched corrugate by compressing or stretching modify the flex in the leading and trailing edges of the wing. The deformation is efficient in that it takes over much lower stresses compared to wire-based flex. The elimination of wire removes cyclical stresses within the corrugate, thus reducing the structures' vulnerability to mechanical fatigue, and increasing the lifetime of the airfoil.

Referring now to FIGS. 9A and 9B, in some embodiments, a morphable airfoil 900 having a leading edge 901, a trailing edge 911, and a wing envelope 903 skin can be provided and can include an active corrugate 907, which can include actuable hinge domains 913 and actuable facets 909. The active corrugate 907 can generally be attached, at a plurality of hinge domain 913 sites, to the wing envelope 903. As shown in FIG. 9A, in some embodiments the hinges 913 can be partially contracted and the facets 909 can be fully expanded to form a substantially triangular corrugate 907 and a substantially symmetrical airfoil profile for lower drag. As shown in FIG. 9B, contraction of the facets 909 can lead to a more curved corrugate 907 and a higher-camber airfoil shape for higher-lift.

Figure 10A:
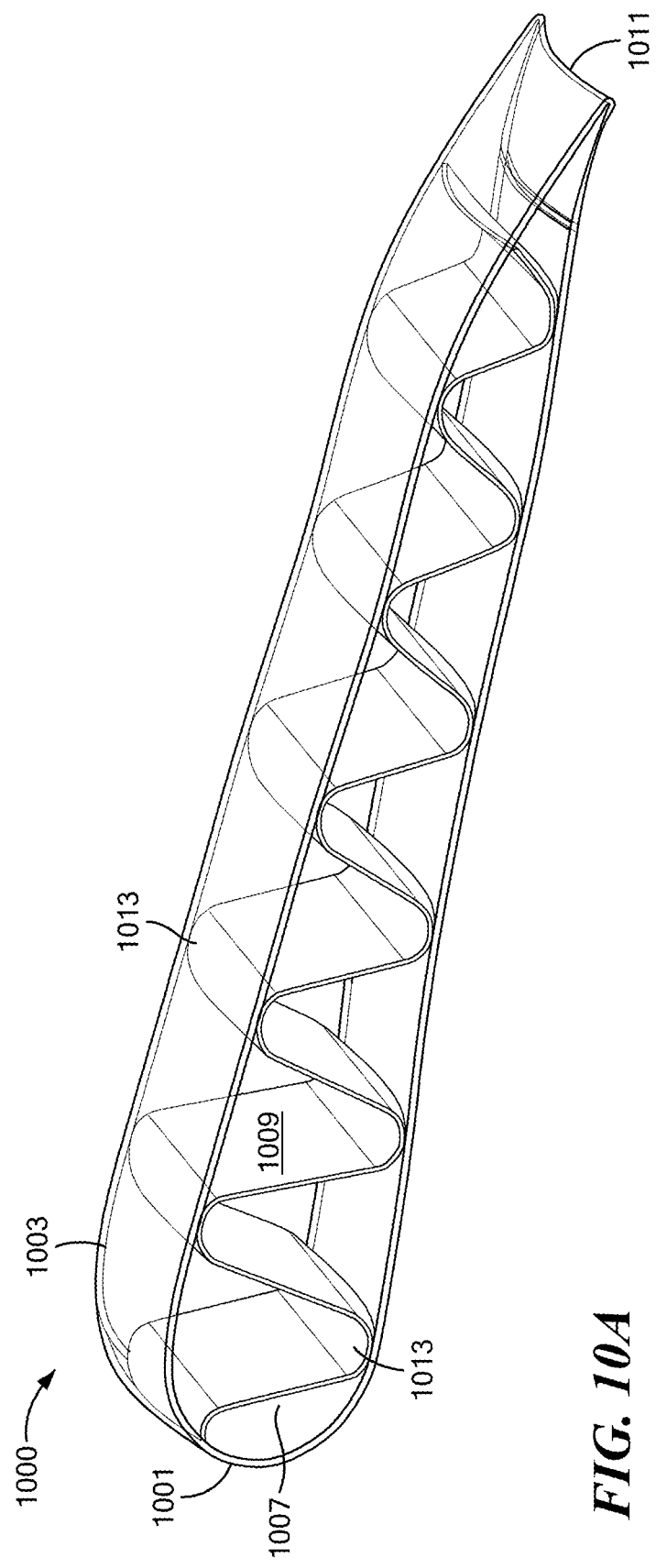
FIGS. 10A-10B illustrate an airfoil incorporating an active corrugate and exhibiting morphing along a stiff axis of the corrugate in accordance with various embodiments.
Figure 10B:
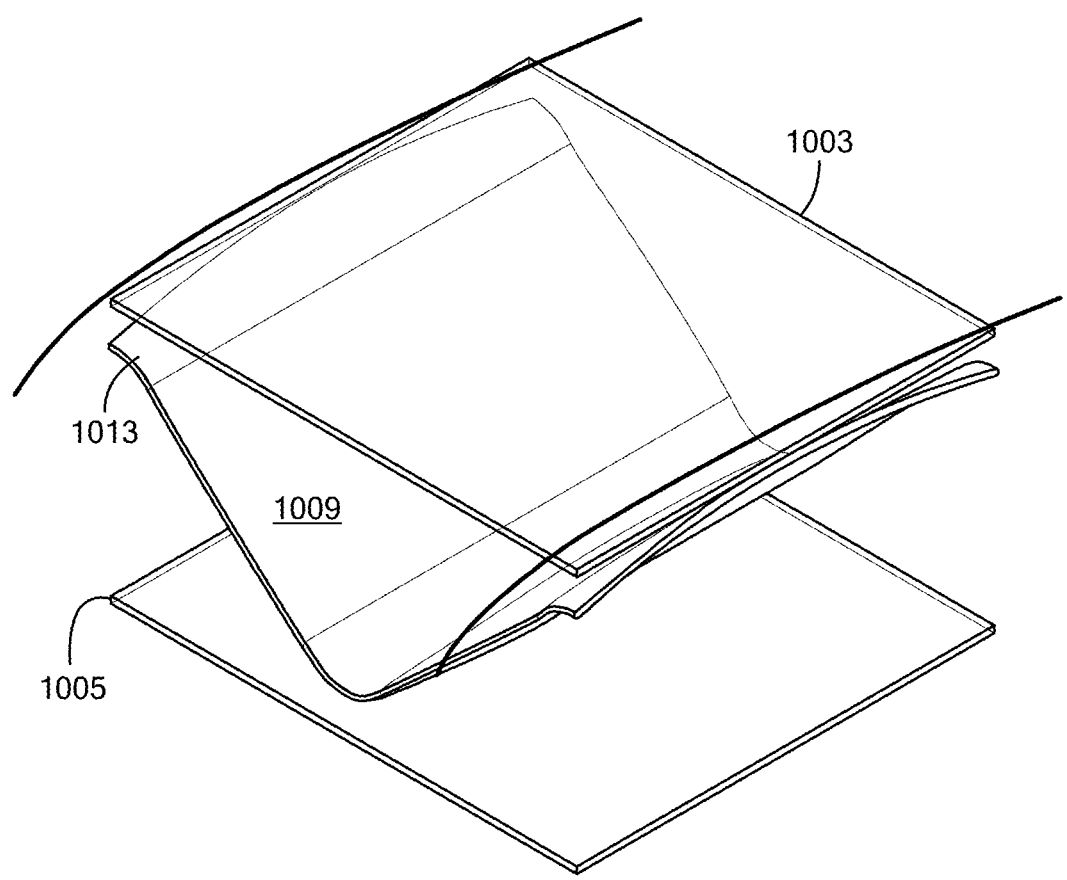
Figure 11A:
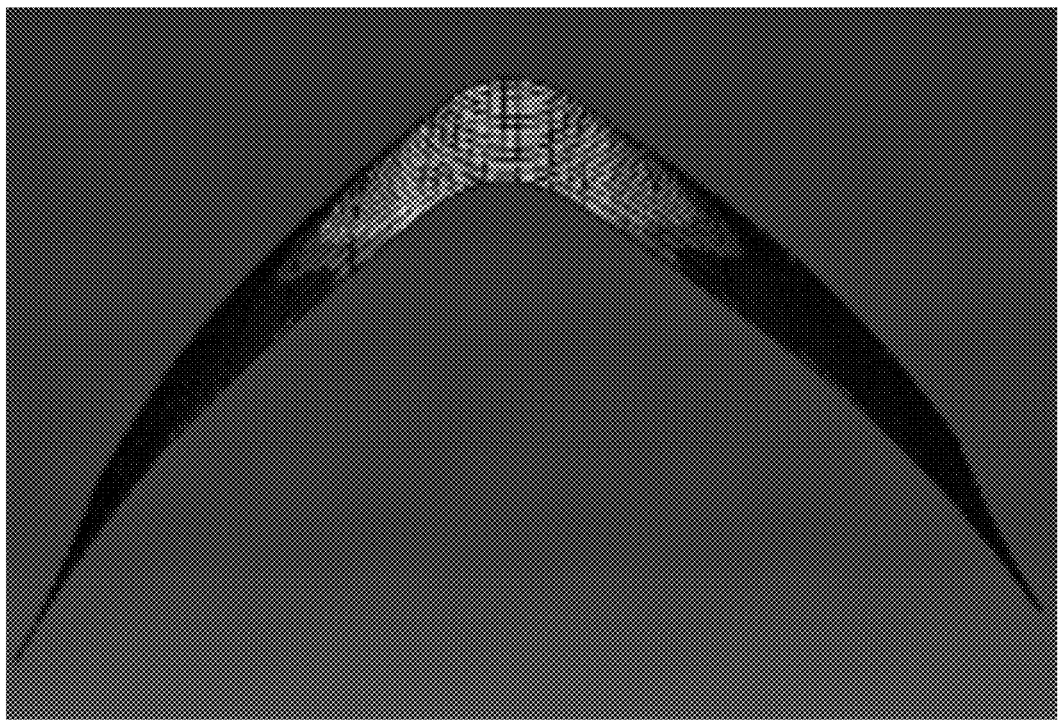
FIGS. 11A-11C are finite element models illustrating deformation of an active corrugate along both the flexible axis and the stiff axis in accordance with various embodiments.
Figure 11B:
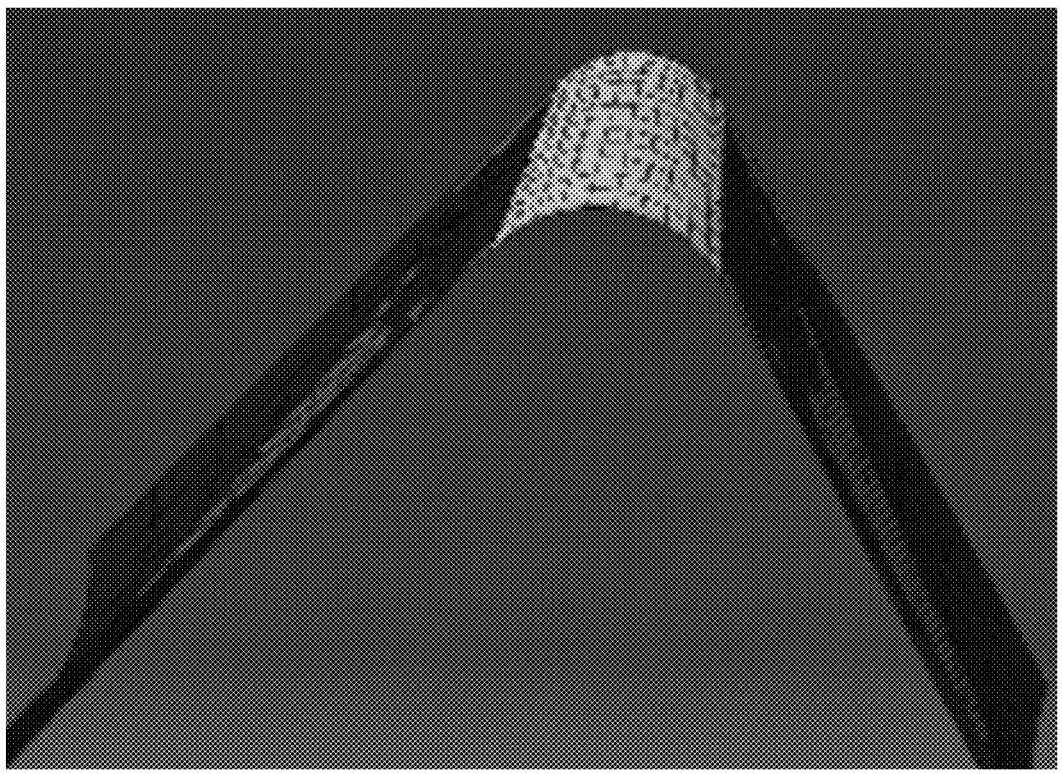
Figure 11C:
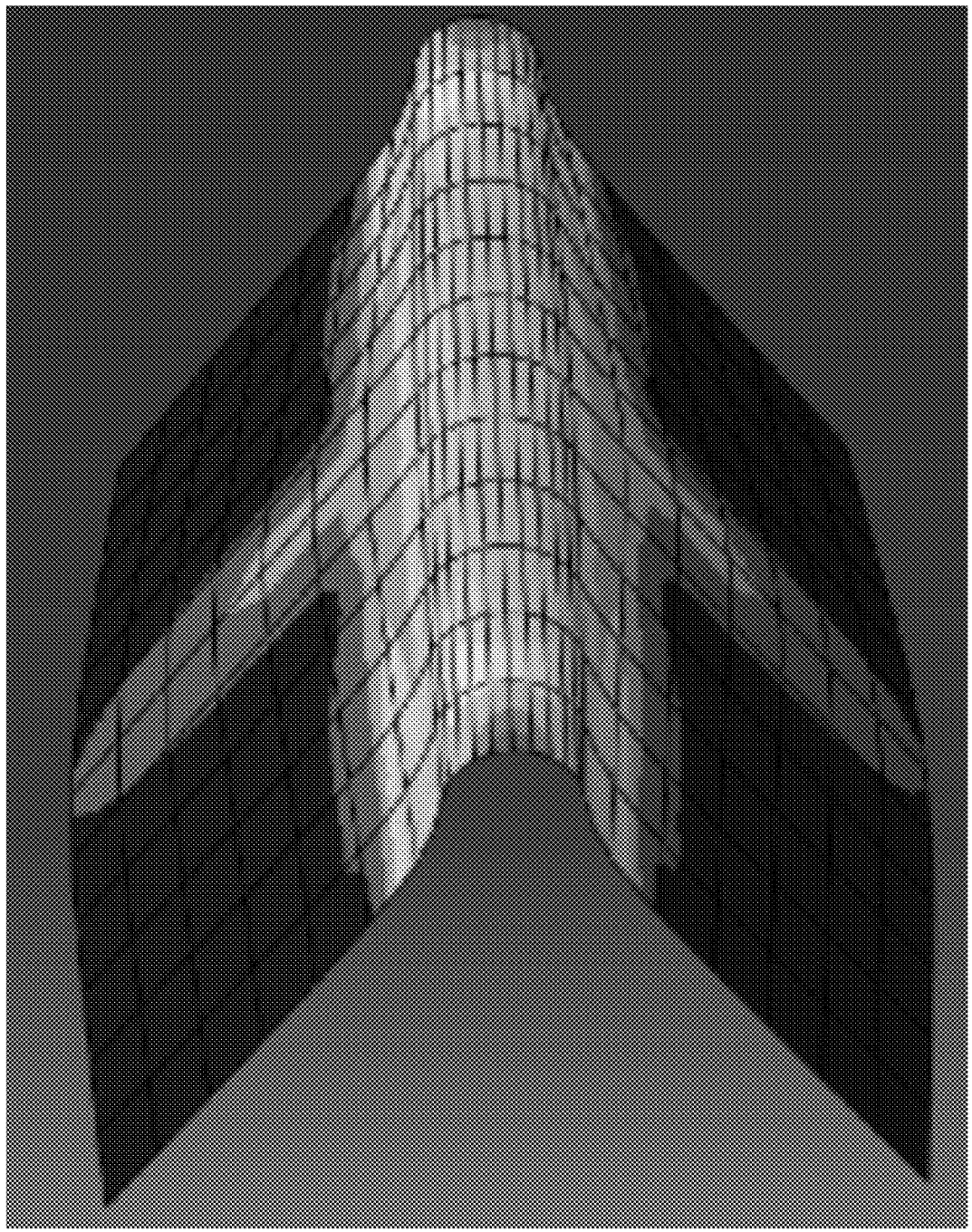

The active origami strategy presented herein also results in tunable stiffness of the corrugate and permits morphing of the corrugate-skin bonded interface along the stiff direction. Referring now to FIGS. 10A-10B, a 3-D morphable airfoil 1000 can permit out-of-plane morphing in the stiff direction (i.e., perpendicular to the folding and morphing in the flexible direction) of an active corrugate 1007 can be achieved by independent control over the expansion within hinges 1013 and facets 1009, or independently prescribed and superposable combinations of $\alpha_H$ and $\alpha_F$, thereby permitting control over the wingspan of an aircraft while reducing the stresses at this interface. Similar to the morphable airfoil 900 discussed above in connection with FIGS. 9A-9B, the 3-D morphable airfoil 1000 can generally include a leading edge 1001, a trailing edge 1011, an airfoil envelope 1003 skin, and the active corrugate 1007 having the actuable hinges 1013 and the actuable facets 1009. The ability to effect 3D changes in the wing shape represents a breakthrough design for agile and efficient aerial vehicles. Such out-of-plane morphing in the stiff direction of the corrugate 1007 of the 3-D morphable airfoil 1000 can be seen in FIGS. 11A-11C. In particular, FIGS. 11A-11C provide finite element modeling showing deformations associated with morphing of the hinges 1013 and facets 1009 in the stiff direction.

Aircraft with Morphable Wings

Figure 12A:
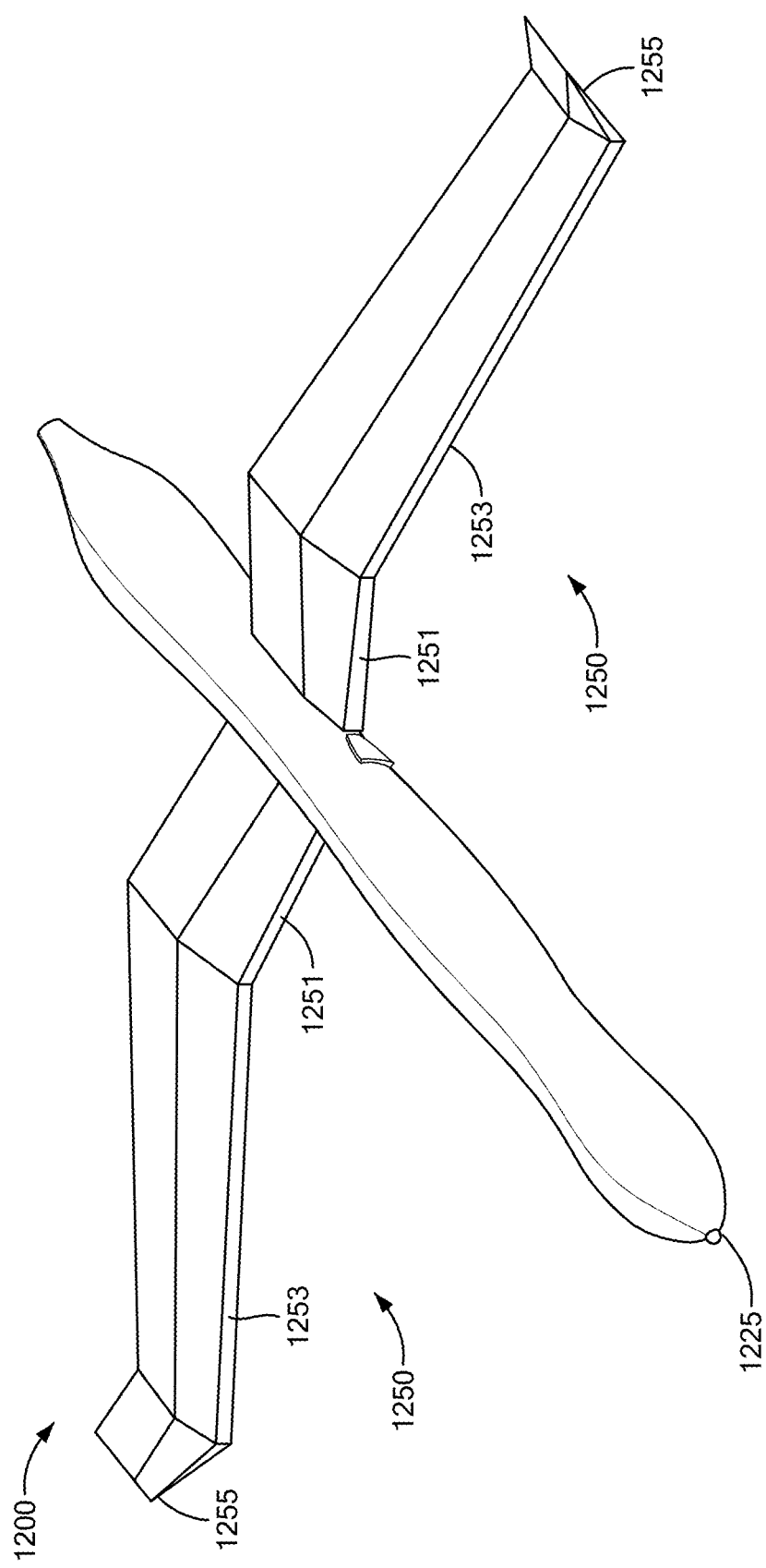
FIGS. 12A and 12B illustrate an aircraft having variable morphing wings in accordance with various embodiments.
Figure 12B:
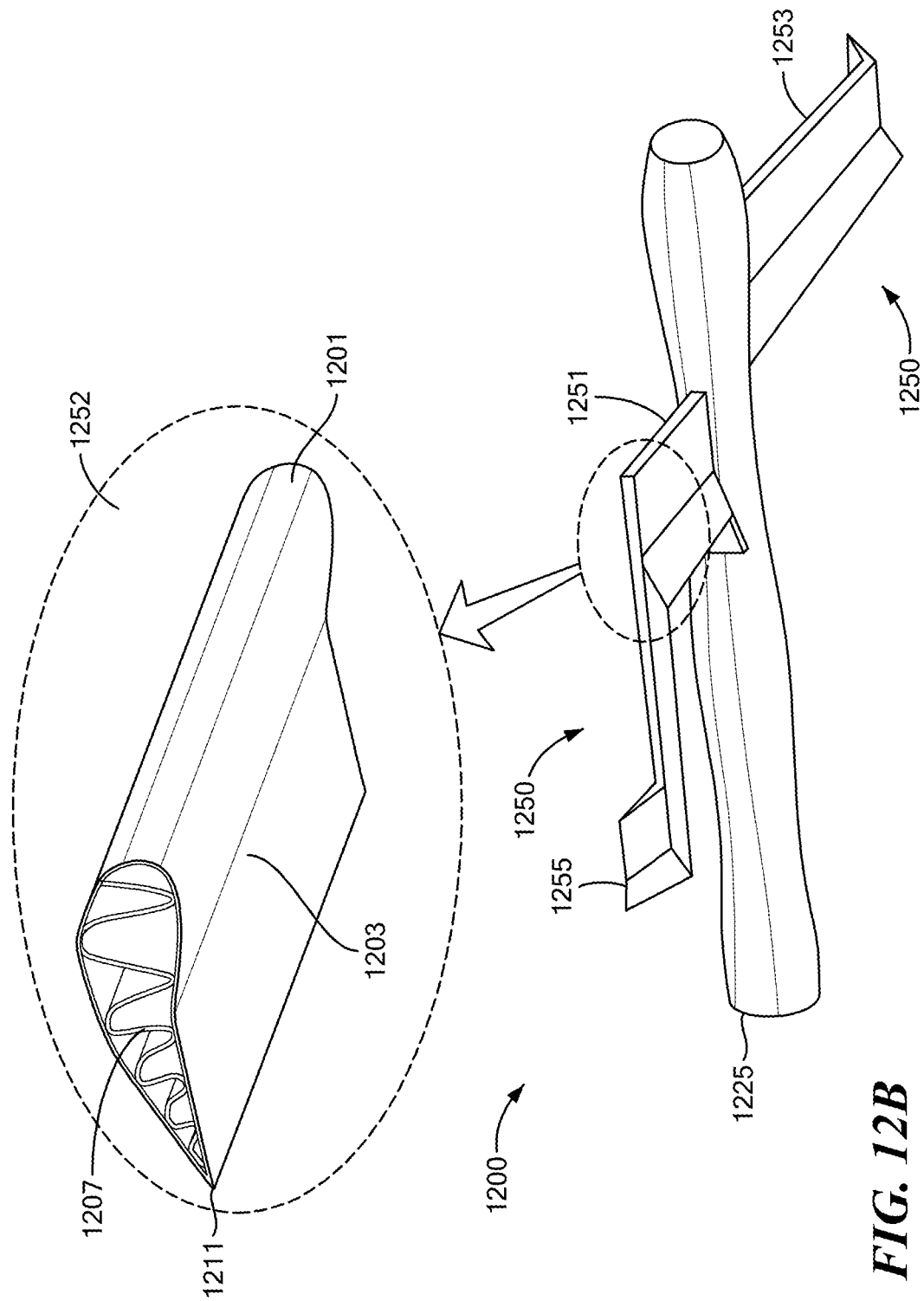

As shown in FIGS. 12A and 12B, in some embodiments, morphable corrugate airfoils can be implemented in morphable wings 1250 extending from a fuselage 1225 of an aircraft 1200. Such aircraft may include any suitable aircraft including, for example, a drone, a passenger jet, manned military aircraft, underwater propelled vehicles, etc. In addition, it will be apparent in view of this disclosure that, in accordance with some embodiments, a skin of the fuselage 1225 may also incorporate the morphable corrugates disclosed herein in order to optimize fuselage aerodynamics within the context of instant flight conditions.

Each morphable wing 1250 can include a plurality of morphable wing sections 1251, 1253, 1255. For example, as shown, the aircraft 1200 includes a root section 1251, a spanwise section 1253, and a wingtip section 1255. Each morphable wing section 1251, 1253, 1255 can include one or more morphable airfoil sections 1252 extending chordwise and/or spanwise therethrough (see inset of FIG. 12B). Each such morphable airfoil section 1252 can include, as discussed hereinabove, a leading edge 1201, a trailing edge 1211, an active corrugate 1207 having actuable hinges and actuable facets, and an airfoil envelope 1203 skin bonded to the hinges 1213. By controlling the 3-D morphability of the active corrugate morphable airfoils disclosed herein, it can be seen in FIGS. 12A-12B that, in addition to varying airfoil camber along the chord of the wing 1250 in the various wing sections 1251, 1253, 1255, each wing 1250 is also able to effect changes to angle of attack and bending along the span of the wing 1250 such that the root section 1251 has been morphed to angle upward relative to the fuselage 1225, the spanwise section 1253 has been morphed to angle downward relative to both the fuselage 1225 and the root section 1251, and the wingtip section 1255 has been morphed to angle back upward relative to the fuselage 1225 and the spanwise section 1253 in order to form a wingtip.

Control over the local as well as global (overall) shape of the corrugated structure provides control over the aerodynamic loads and high wing flex. The technology combines large flex and morphs of the camber, while increasing aerodynamic rigidity of the structure due to the enhanced energy stored within the actuated structure. Thus, the actuation is no longer limited to a wire compression design. Rather, the possibility of pneumatic, thermal, electrical, magnetostrictive, or phase actuation allows for smooth morphing of the wings, and lower weight. The technology can provide high aerodynamic rigidity while allowing for high flex for automated morphing wings. The technology can enable removal of cumbersome, heavy flaps and ailerons currently used to morph wings. The technology can provide a sandwich corrugated composite that imparts rigidity while allowing for high deformation using a variety of actuation mechanisms.

In sum, morphing functionalities in aerial vehicles is a key enabler for improving maneuverability, stability, and resilience while reducing energy consumption, fuel consumption, and/or reducing noise pollution.

INDUSTRIAL APPLICATIONS

As discussed throughout this disclosure, the technology is applicable for morphing wings for aeronautical wings, and for morphing wings of drones and related structures. More generally, it will be apparent in view of this disclosure that, although described and shown herein in the context of aircraft wings, the variable morphing "active" corrugates described herein can also be used in connection with any application wherein a reconfigurable morphing surfaces are useful. For example, the technology can be used for shape changing sandwiched composites in building technologies and for soft deformable structures for mechanical metamaterials. The technology can be used for self-folding corrugated structures (e.g., blinds for windows), as mechanical meta materials for electromechanical and optical materials, making nanoscale surfaces with controlled surface area, hydrofoils, submarine hulls, surface boat or ship hulls, other marine applications, or any other suitable use.

As used herein, "consisting essentially of" allows the inclusion of materials or steps that do not materially affect the basic and novel characteristics of the claim. Any recitation herein of the term "comprising," particularly in a description of components of a composition or in a description of elements of a device, can be exchanged with "consisting essentially of" or "consisting of."

To the extent that the appended claims have been drafted without multiple dependencies, this has been done only to accommodate formal requirements in jurisdictions that do not allow such multiple dependencies.

The present technology has been described in conjunction with certain preferred embodiments and aspects. It is to be understood that the technology is not limited to the exact details of construction, operation, exact materials or embodiments or aspects shown and described, and that various modifications, substitution of equivalents, alterations to the compositions, and other changes to the embodiments and aspects disclosed herein will be apparent to one of skill in the art.

What is claimed is:

1. A morphable active corrugate structure comprising:
   upper and lower skins; and
   a sheet having;
      a plurality of independently actuable hinge domains, each attached to one of the upper and lower skins and having a hinge domain through-thickness differential expansion coefficient ($\alpha_H$), and
      a plurality of independently actuable facet domains, each adjacent to one of the hinge domains, not attached to the upper and lower skins, and having a facet domain through-thickness differential expansion coefficient ($\alpha_F$), wherein, for adjacent facet and hinge domains, $\alpha_F < \alpha_H$ and a thickness of the facet domain ($h_F$) is less than a thickness of the adjacent hinge domain ($h_H$) in an unactuated state,
   wherein the application of a domain-specific actuation force ($\Delta F$) to one or more of the hinge and/or facet domains generates differential strains in the one or more of the hinge and/or facet domains, causing the sheet to locally expand or contract along a flexible direction of the sheet to create a local curvature (K) according to the relationship $K=\alpha\Delta F/h$ to produce a morphable shape of the active corrugate structure; and
   wherein the applied $\Delta F$ is adjustable to change the differential strains in the one or more of the hinge and/or facet domains to produce a different morphable shape of the active corrugate structure.

2. The morphable active corrugate structure of claim 1, wherein the differential strains cause the sheet to at least one of deform or bend along a direction of the sheet perpendicular to the flexible direction.

3. The morphable active corrugate structure of claim 1, wherein the skin is elastic.

4. The morphable active corrugate structure of claim 3, wherein:
   in a fully expanded state of the hinge domains and the facet domains, the sheet is flat and extends in parallel contact with the upper and lower skins; and
   in a contracted state of at least one of the hinge domains and the facet domains, the sheet is at least one of folded or corrugated and the facet domains are at least partially separated from the upper and lower skins.

5. The morphable active corrugate structure of claim 1, wherein in a fully expanded state of the hinge domains and the facet domains, the sheet is at least one of folded or corrugated and the facet domains are at least partially separated from the upper and lower skins.

6. The morphable active corrugate structure of claim 5, wherein at least one of expansion or contraction of the sheet causes flexure of the upper and lower skins.

7. The morphable enveloped corrugate structure of claim 1, wherein at least one of expansion or contraction of the sheet causes flexure of at least one of the upper skin or the lower skin along a stiff direction of the sheet, perpendicular to the flexible direction of the sheet.

8. The morphable active corrugate structure of claim 1, wherein each of the independently actuable hinge domains and the independently actuable facet domains is actuable by application of $\Delta F$ by an actuation driver, the actuation driver including at least one of thermal actuation, electrical actuation, magnetic actuation, pneumatic actuation, phase actuation, or combinations thereof.

9. A morphable enveloped corrugate structure comprising:
   a skin forming an envelope;
   a sheet within the envelope having;
      a plurality of independently actuable hinge domains each attached to the skin and having a hinge domain through-thickness differential expansion coefficient ($\alpha_H$), and
      a plurality of independently actuable facet domains, each adjacent to one of the hinge domains, not attached to the skin, and having a facet domain through-thickness differential expansion coefficient ($\alpha_F$), wherein, for adjacent facet and hinge domains, $\alpha_F < \alpha_H$ and a thickness of the facet domain ($h_F$) is less than a thickness of the adjacent hinge domain ($h_H$) in an unactuated state, wherein the application of a domain-specific actuation force ($\Delta F$) to one or more of the hinge and/or facet domains generates differential strains in the one or more of the hinge and/or facet domains, causing the sheet to locally expand or contract along a flexible direction of the sheet to create a local curvature (K) according to the relationship K=$\alpha \Delta F$/h to produce a morphable shape of the enveloped corrugate structure; and wherein the applied $\Delta F$ is adjustable to change the differential strains in the one or more of the hinge and/or facet domains to produce a different morphable shape of the enveloped corrugate structure.

10. The morphable enveloped corrugate structure of claim 9, wherein at least one of expansion or contraction of the sheet causes flexure of the envelope along the flexible direction of the sheet.

11. The morphable enveloped corrugate structure of claim 9, wherein at least one of expansion or contraction of the sheet causes flexure of the envelope along a stiff direction of the sheet, perpendicular to the flexible direction of the sheet.

12. The morphable enveloped corrugate structure of claim 9, wherein the envelope is an airfoil shaped wing envelope.

13. The morphable enveloped corrugate structure of claim 9, wherein each of the independently actuable hinge domains and the independently actuable facet domains is actuable by application of $\Delta F$ by an actuation driver, the actuation driver including at least one of thermal actuation, electrical actuation, magnetic actuation, pneumatic actuation, phase actuation, or combinations thereof.

14. An aeronautical wing comprising:
 a wing envelope;
 a sheet within the wing envelope having:
  a plurality of independently actuable hinge domains each attached to the wing envelope and having a hinge domain through-thickness differential expansion coefficient ($\alpha_H$), and
  a plurality of independently actuable facet domains, each adjacent to one of the hinge domains, not attached to the wing envelope, and having a facet domain through-thickness differential expansion coefficient ($\alpha_F$), wherein, for adjacent facet and hinge domains, $\alpha_F < \alpha_H$ and a thickness of the facet domain ($h_F$) is less than a thickness of the adjacent hinge domain ($h_H$) in an unactuated state, wherein the application of a domain-specific actuation force ($\Delta F$) to one or more of the hinge and/or facet domains generates differential strains in the one or more of the hinge and/or facet domains, causing the sheet to locally expand or contract along a flexible direction of the sheet to create a local curvature (K) according to the relationship K=$\alpha \Delta F$/h to produce a morphable shape of the aeronautical wing; and wherein the applied $\Delta F$ is adjustable to change the differential strains in the one or more of the hinge and/or facet domains to produce a different morphable shape of the aeronautical wing.

15. The aeronautical wing of claim 14, wherein each of the independently actuable hinge domains and the independently actuable facet domains is actuable by an actuation driver, the actuation driver including at least one of thermal actuation, electrical actuation, magnetic actuation, pneumatic actuation, phase actuation, or combinations thereof.

16. The aeronautical wing of claim 14, wherein the flexible direction of the sheet is oriented parallel to a chordwise direction of the wing envelope.

17. The aeronautical wing of claim 14, further comprising at least one additional sheet within the wing envelope, the at least one additional sheet positioned adjacent to or spaced apart from the sheet along a spanwise direction of the wing envelope.

18. The aeronautical wing of claim 14, wherein at least one of expansion or contraction of the sheet causes flexure of the wing envelope along the flexible direction of the sheet.

19. The aeronautical wing of claim 18, wherein the flexure of the wing envelope along the flexible direction of the sheet alters at least one of a lift produced by the aeronautical wing or a coefficient of drag of the aeronautical wing.

20. The aeronautical wing of claim 14, wherein at least one of expansion or contraction of the sheet causes flexure of the wing envelope along a stiff direction of the sheet, perpendicular to the flexible direction of the sheet.

21. The aeronautical wing of claim 20, wherein the flexure of the wing envelope along the stiff direction of the sheet forms a winglet of the aeronautical wing.

* * * * *